United States Patent [19]
Neill

[11] 3,742,302
[45] June 26, 1973

[54] MOTOR RELAY PROTECTION FOR REFRIGERANT COMPRESSOR MOTORS
[75] Inventor: Donald E. Neill, Liverpool, N.Y.
[73] Assignee: Carrier Corporation, Syracuse, N.Y.
[22] Filed: Oct. 12, 1971
[21] Appl. No.: 188,053

[52] U.S. Cl............. 317/13 R, 317/33 SC, 317/22, 317/36 TD
[51] Int. Cl. ............................................ H02h 3/08
[58] Field of Search .................. 317/33 SC, 33 XR, 317/13 R, 22, 36 TD, 49, DIG. 6

[56] References Cited
UNITED STATES PATENTS
| | | | |
|---|---|---|---|
| 3,369,154 | 2/1968 | Swain............................. | 317/33 SC |
| 3,582,713 | 1/1971 | Till................................. | 317/33 XR |
| 3,660,718 | 6/1970 | Pinckaers....................... | 317/33 SC |
| 3,132,287 | 5/1964 | Yarbrough..................... | 317/33 SC |

*Primary Examiner*—James D. Trammell
*Assistant Examiner*—Harvey Fendelman
*Attorney*—Harry G. Martin, Jr. and J. Raymond Curtin

[57] ABSTRACT

A refrigerant compressor motor is provided with a motor protection and control system providing various motor control functions in response to motor current, refrigeration system temperature, thermostat contact opening and closing and motor relay solenoid current. A resistor in series with the motor relay solenoid provides a voltage drop signal which is integrated to provide a control signal to a trip circuit which, in turn, de-energizes the motor relay in the event that the integrated relay current signal exceeds a predetermined trip threshold magnitude. If the solenoid current drops to a normal value after being initially energized, the integrator output remains below the trip threshold and the solenoid remains energized. In the event that the solenoid current fails to drop to a normal operating value after a period of time, the integrator output rises to a level which exceeds the trip level and de-energizes the solenoid. Additional time delay means is provided so that a period of time must elapse before the solenoid can be re-energized to permit it to cool.

2 Claims, 2 Drawing Figures

INVENTOR
DONALD E. NEILL
BY
Frank M. Decker Jr.
ATTORNEY

3,742,302

MOTOR RELAY PROTECTION FOR REFRIGERANT COMPRESSOR MOTORS

CROSS REFERENCE TO RELATED APPLICATION

This application discloses features which are the subject of my co-pending application Ser. No. 188,286 filed Oct. 12, 1971.

BACKGROUND OF THE INVENTION

A refrigerant compressor motor is usually controlled by a system which energizes the solenoid of a motor relay to connect and disconnect the compressor motor windings to a source of electric power. In the past, very little thought has been given to the need of protecting the motor relay from damage due to abnormal conditions. However, it is known that a motor relay can fail due to dust, sand, bugs or other foreign objects insinuating themselves between the relay armature and the solenoid in such a manner that they prevent the relay armature from pulling in properly. In addition, dirt and corrosion may cause the motor armature to hang up in some position which prevents the relay contacts from closing. In the event that the motor relay armature is prevented from completely pulling in, the impedance of the relay solenoid remains abnormally low and the consequent high solenoid current can quickly burn out the relay. Failure of the relay contacts to fully and completely close may result in pitting, arcing and burning of the contacts which will eventually cause them to malfunction. The refrigeration system may be rendered totally inoperative by a burned out relay which will require an expensive replacement and consequent down time for the system, all of which could have been prevented if the relay had not become damaged before the foreign matter had been removed from the relay.

Accordingly, it is a principal object of this invention to provide a control system for a refrigerant compressor motor which includes means for protecting the motor relay solenoid from damage.

SUMMARY OF THE INVENTION

A refrigerant compressor motor is provided with a control which includes relay solenoid current sensing means. A trip circuit having a predetermined threshold is provided for actuating a solid state switch to a nonconducting condition which in turn de-energizes the compressor motor relay and the compressor motor. An integration circuit is provided to integrate the relay solenoid current related signal and provide an integrated output signal to the trip circuit.

The integration function is chosen so that the output of the integration circuit remains below the trip level provided the initially high relay solenoid current drops to a normal operating value in a short time as a result of the relay armature pulling in. If the relay armature fails to pull in properly and the solenoid current consequently remains high, the output of the integration circuit exceeds the trip level after a short period of time and the relay is de-energized.

Additional time delay means is provided to prevent re-energization of the relay solenoid until after a sufficient period of time has elapsed to permit the solenoid to cool, so that it will not be damaged due to a cumulative heating effect by successive attempts at energizing the compressor.

DESCRIPTION OF THE PREFERRED EMBODIMENT

Figure 1:
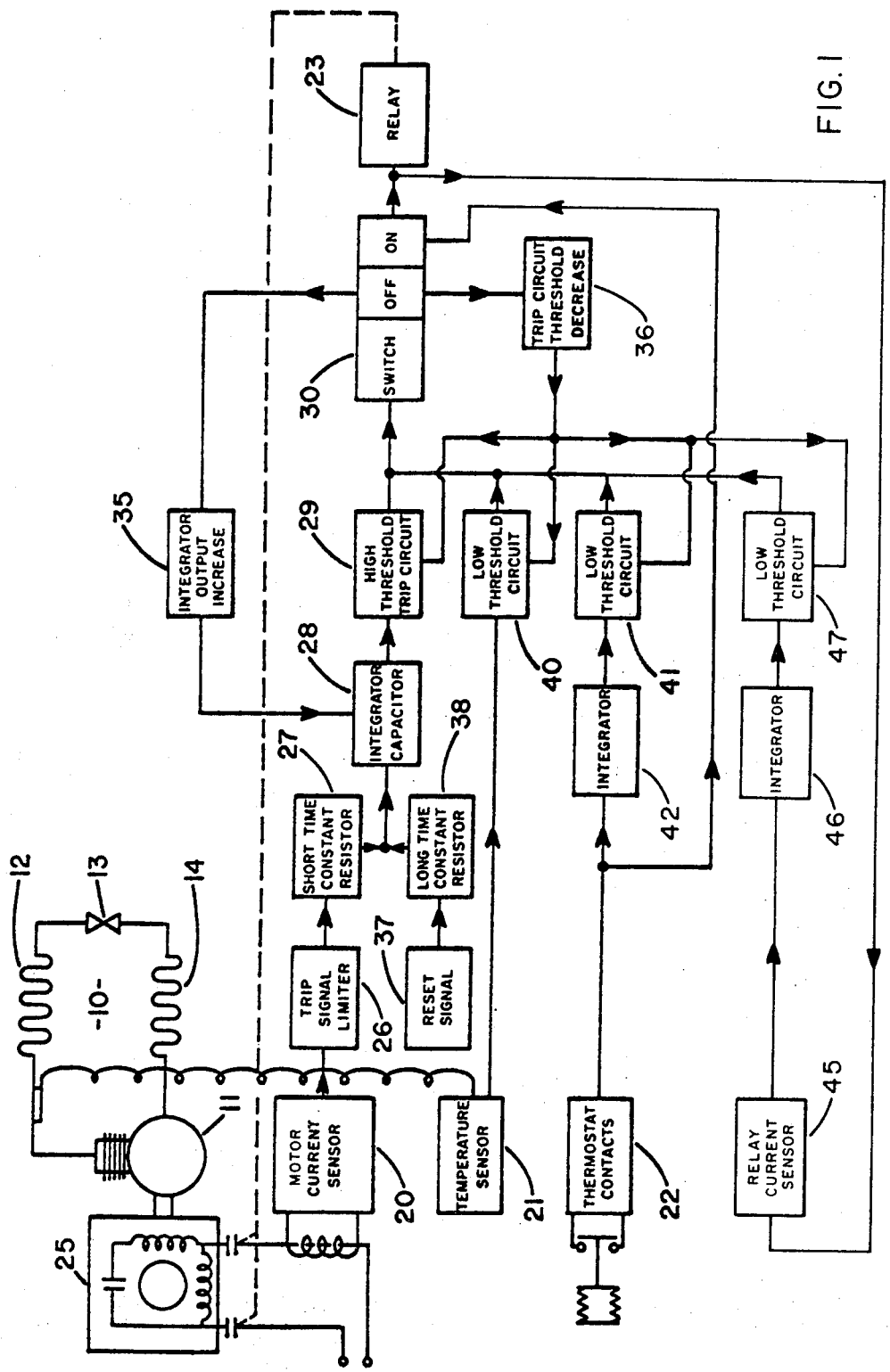
FIG. 1 is a schematic illustration of a reciprocating refrigeration system having a motor protection and control system illustrated in block diagram form.

A refrigeration system 10 comprising a reciprocating compressor 11, a condenser 12, an expansion device 13 and an evaporator 14 is driven by an electric motor 25. While for purposes of illustration, a simple reciprocating refrigeration system is shown, it will be appreciated that the motor protection and control system of this invention may be employed in various single or multiple phase electric motor driven systems.

The basic operation of the motor protection system will be described with reference to the block diagram in FIG. 1. A motor current sensor 20 which is preferably a current transformer in the common lead of the compressor motor provides a signal output proportional to the motor current and thereby is capable of providing an indication of a motor overload. The signal from the motor current sensor is passed through trip signal limiter 26 and through a short time constant resistor 27 to an integrator capacitor 28. The trip signal limiter limits the magnitude of the overload signal at some high value, indicating a locked rotor or other serious motor overload condition for various motors having somewhat different maximum locked rotor currents.

A second signal of opposite current polarity is also supplied to integrator capacitor 28 from reset signal source 37. The two signals are effectively summed to provide a signal to the integrator capacitor which is a function of the difference between the motor current signal and the reset signal. If the reset signal is equal to or larger than the motor current signal, trip circuit 29 will remain in the set state and not affect the system. If the motor current signal is sufficiently greater than the reset signal, the integrator voltage output will eventually reach the trip threshold level of trip circuit 28 unless the over current condition corrects itself first.

After the signal from integrator 28 has reached the threshold of high threshold trip circuit 29, this circuit will activate switch 30 to the off condition which de-energizes relay 23 and compressor motor 25. The length of time required to deenergize motor 25 under locked rotor conditions will depend on the time constant determined by resistor circuit 27 and may typically be on the order of about 1¼ seconds. If a smaller motor overload less than the limiting level of limiter 26 is experienced, integrator 28 will not reach the trip level of circuit 29 for a somewhat longer period of time due to the integration function, thereby allowing the motor more time to attempt to start.

When switch 30 is actuated to its off state, a regenerative feedback signal is fed through circuit 35 to integrator 28 which increases the signal output from the integrator. Similarly, a second feedback signal is provided from switch 30 when it is in the off state through circuit 36 to decrease the threshold of trip circuit 29. This signal is also in effect a regenerative feedback which causes high threshold trip circuit 29 to have a lower reset level from that existing prior to the trip.

Switch 30 will remain in the off condition for some preselected period of time which may be typically on the order of five minutes. Since there is no motor current signal, the off period is solely governed by the time required for reset signal 37 passing through long time constant resistor 38 to be integrated by integrator capacitor 28 and achieve an integrator output level corresponding to the reset level established for high threshold trip circuit 29. When this occurs, the high threshold trip circuit is deactivated, thereby switching switch 30 to its on condition. The on condition of switch 30 enables relay 23 to be energized by a current passing through thermostat contacts 22, from a transformer or other suitable source, provided that the thermostat contacts are closed. When the thermostat contacts open, the current to relay 23 is interrupted, thereby stopping compressor motor 25.

A temperature sensor 21, which may sense various conditions, is preferably attached to the compressed gas discharge line from the compressor and provides a signal to low threshold trip circuit 40 to protect against abnormal conditions in the refrigeration system such as slow loss of refrigerant. When temperature sensor 21 senses an excessive gas discharge temperature, its output causes low threshold trip circuit 40 to activate switch 30 to the off condition, thereby de-energizing motor 25. When switch 30 is activated to the off condition, feedback circuits 35,36, previously described, raise the output of integrator 28 and decrease the trip threshold sufficiently to trip high threshold trip circuit 29. Consequently, all of the trip circuits have a reset level lower than their initial trip levels. Switch 30 will thereafter again be activated to the on condition, assuming all sensors are below the trip level, after a time delay determined by resistor 38 and integrator capacitor 28.

Thermostat contacts 22 are connected to a source of low voltage alternating current, such as a transformer, connected to terminals 90,91. Contacts 22 open, when cooling is not required, and the open circuit voltage signal across them is transmitted through integrator 42 to low threshold trip circuit 41 which actuates switch 30 to an off condition after a short time delay sufficient to prevent nuisance trips but short enough to prevent contactor damage. Contacts 22 close when calling for cooling and the low voltage alternating current is enabled to pass through contacts 22 and switch 30 to relay 23 and actuate compressor motor 25.

In accordance with this invention, a relay current sensor 45 is provided to sense the current passing through the relay solenoid. The magnitude of this signal is integrated by an integrator circuit 46 which has the characteristic that the output of the integrator never exceeds a predetermined trip threshold as long as the initially high inrush solenoid current diminishes to a normal steady state condition in the period of time required to pull in the relay armature. In the event that the solenoid current fails to drop, the integrator output exceeds the trip threshold of low threshold circuit 47 in a short time, which in turn causes switch 30 to assume a nonconducting condition so as to de-energize relay 23.

When switch 30 is actuated to the nonconducting condition, feedback circuits 35 and 36 trip high threshold trip circuit 29. Accordingly, a time delay, normally less than that which would be experienced upon a motor current trip, is imposed on resetting of switch 30 to the conducting condition. This allows a sufficient period of time to elapse for the relay solenoid to cool so that it will not be damaged by the cumulative heating effect of successive attempts to cause the relay to start motor 25.

After a trip occurs due to any of the inputs to the circuit, a reset signal 37 passes through long time constant resistor 38 to integrator 28 so that the circuit will be reset after a predetermined period of time, providing the inputs are below the reset level. However, a trip due to excessive relay current normally will not require as long a reset time as a trip due to motor over current because of the initially lower integrator output at the time of trip.

Figure 2:
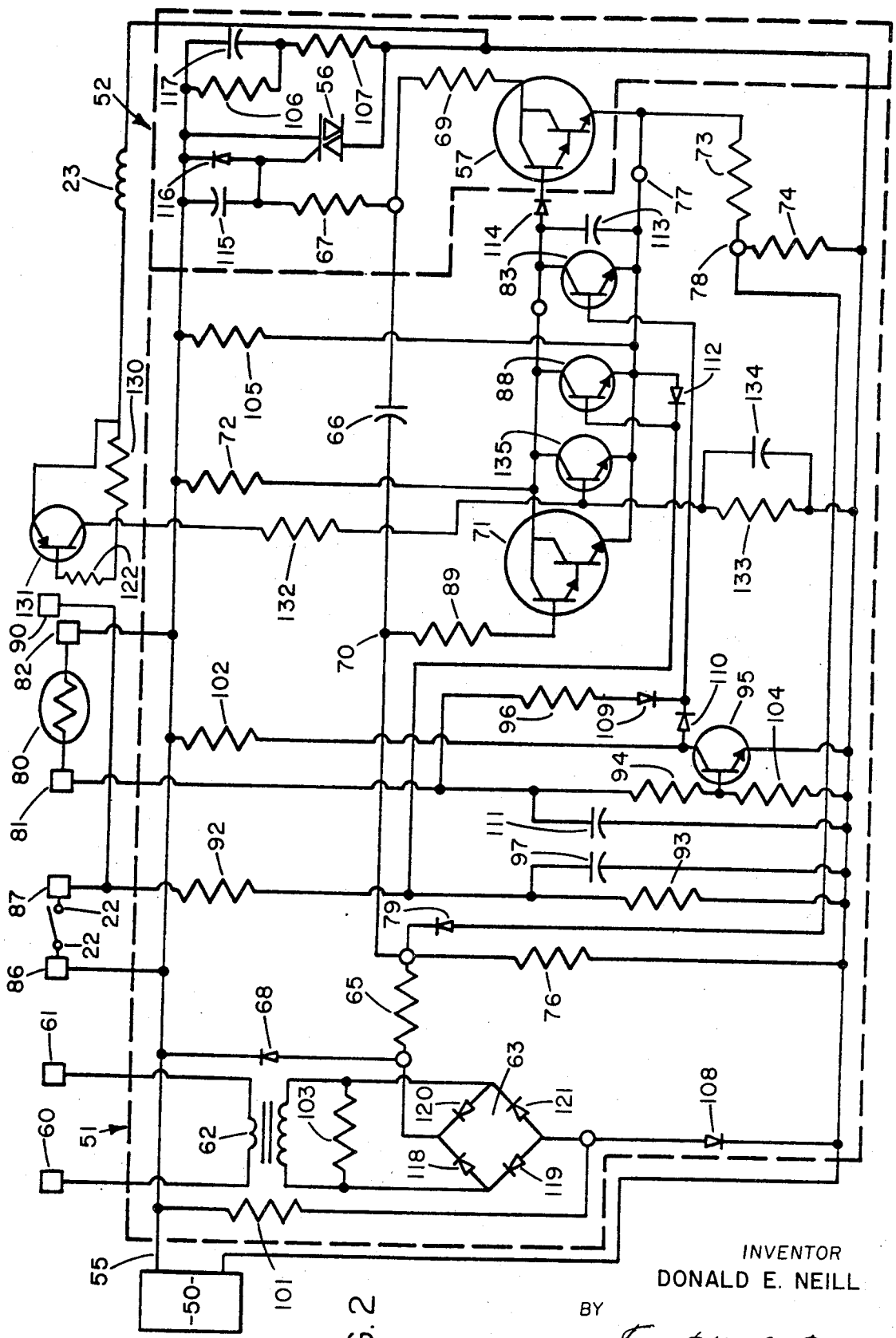
FIG. 2 is a schematic illustration of a suitable electronic circuit for a motor control system in accordance with this invention.

Referring particularly to FIG. 2, the actual circuit consists of a power supply 50, a trip circuit 51 and a switch circuit 52. Power supply 50 simply provides a regulated B+ voltage at terminal 55 and need not be specifically described since any conventional power supply circuit may be utilized.

Switch circuit 52 comprises a Triac 56 or other semiconductor switch in series with the contactor coil of relay 23. Switching of Triac 56 is controlled by a Darlington transistor pair 57 which is actuated by the current input to its base.

The trip and timing circuit 51 includes the input signal circuits, reset signal circuitry, integration circuitry and the trip and feedback circuits previously discussed.

Terminals 60 and 61 are preferably in series with the common lead of the motor windings. Current transformer 62 and resistor 103 provide a voltage to bridge rectifier 63. The output of the rectifier bridge provides a signal through resistor 65 which tends to discharge capacitor 66 which is connected through resistor 67 and the gate circuit of Triac 56 to the B+ supply voltage. Capacitor 66 performs the integration function of block 27. A diode 68 limits the peak voltage output of the rectifier bridge circuit to a voltage slightly above the B+ supply and performs the trip signal limiting function designated by block 26. Resistor 65 in combination with integrator capacitor 66 forms a short time constant circuit which determines the time required to discharge capacitor 66 sufficiently to cause a trip of the switch circuitry.

When the level of signal at input terminal 70, which is connected to the base of Darlington pair 71 through resistor 89, reaches a predetermined positive voltage due to discharge of capacitor 66 through resistor 65, the Darlington pair becomes conductive and causes current to flow through resistor 72, the collector-emitter circuit of pair 71, and resistors 73,74. The current flow through pair 71 reduces the base to emitter voltage across pair 57 causing it to turn off. When pair 71 turns on and pair 57 turns off, gate current no longer flows from Triac 56 through resistors 67,69, and pair 57, so the Triac assumes a nonconducting condition which de-energizes relay 23, opens contacts 75 and de-energizes motor 25.

It will be seen that pair 71 corresponds to the high threshold trip circuit 29 previously described. The preferred circuit uses a high gain trip circuit stage for the motor current trip input, but it will be understood that this high threshold trip circuit could be replaced with a low threshold trip circuit or one using a single input transistor if desired.

When pair 57 is turned off, relatively little current flows from the gate circuit of Triac 56 and the voltage drop across resistor 67 is reduced. Since capacitor 66 is connected to one terminal of resistor 67, its positive terminal rises to a more positive voltage which, in effect, momentarily increases output of the integrator at input 70 by raising this point to a higher positive voltage, thereby tending to drive pair 71 into further conduction as diagrammatically illustrated by block 35 of FIG. 1. A second feedback effect is provided when pair 57 is turned off because the reduced current through resistors 73, 74 causes the emitter of pair 71 to drop to a more negative voltage, thereby reducing the voltage threshold required to trigger pair 71 to a conducting state. By dropping the emitter voltage of pair 71, it will be apparent that the signal level required to turn pair 71 off is lower than the level required to initially turn it on, or in other words, a reset level has been provided which is lower than the trip level as diagrammatically illustrated by block 36.

After switch circuit 52 has been actuated to a nonconducting state, capacitor 66 will slowly charge through resistor 76 which corresponds to long time constant block 38. Eventually, input terminal 70 of capacitor 66 will charge to a more negative voltage than that of the reset potential established for pair 71. As the base of pair 71 becomes more negative, this pair becomes nonconducting, and the voltage on the collector of pair 71 and the base of pair 57 rises so that pair 57 becomes conducting again. At the same time, the larger emitter current flow through pair 57 and resistors 73,74 causes the voltage at conductor 77 to be more positive, thereby driving pair 71 off and pair 57 further into conduction. Also, pair 71 is driven further into a nonconducting state because the voltage drop across resistor 67 increases due to the current flow, from the gate of Triac 56, which has the effect of making the voltage on capacitor 66 and at input terminal 70 more negative. As the voltage at terminal 70 becomes more negative and the voltage at point 78 becomes more positive, diode 79 becomes forward biased and capacitor 66 partially discharges rapidly therethrough. The discharge of capacitor 66 through diode 79 during reset assures that a proper reset time delay will be required after a thermostat related trip.

Thermistor 80 is connected across contacts 81,82 to provide a signal input to transistor 83 which functions as low threshold trip circuit block 40. Similarly, thermostat contacts 86,87 are connected to provide a signal to transistor 88 which functions as low threshold trip circuit block 41 previously described.

If the temperature of thermistor 80 is low (high resistance) and thermostat contacts 81,82 are closed, neither transistor 83 or 88 will be conducting. Under these conditions, assuming low or no motor current, relay 23 can be energized by a suitable low voltage current source connected to the thermostat terminals 90,91. This current flows from terminal 91 through the relay solenoid 23, Triac 56 and thermostat contacts 22, to terminal 90. If the temperature of thermistor 80 is sufficiently high or if the thermostat contacts are open, a positive voltage will appear on the base of transistors 83 or 88 respectively, which will cause switch circuit 52 to become nonconducting thereby increasing the integrator output, reducing the trip threshold to the reset value as previously described and tripping pair 71. It will be noted that it is necessary for each of the sensor inputs to be below the reset level before the switch circuit can thereafter be activated to an on condition. It is also necessary for a minimum time delay determined by the charging rate of capacitor 97 through resistor 92 (corresponding to integrator 42) to expire before the voltage on transistor 88 rises to the trip value.

In accordance with this invention, relay current sensing means comprising a resistor 130 in series with the solenoid of motor relay 25 is provided to sense the current passing through the relay solenoid. A current transformer could be utilized instead to sense the relay current, if desired. In the preferred circuit shown, a transistor 131 is connected with its emitter and base across resistor 130 so that the magnitude of the current drawn by the relay solenoid controls the emitter collector current passing through resistor 132 to charge capacitor 134. A resistor 133 is connected parallel with capacitor 134 to return the collector circuit to the negative power supply terminal. Transistor 131 and resistor 130 corresponds to relay current sensor block 45. Resistors 132,133 and capacitor 134 correspond to integrator block 46. A transistor 135, corresponding with low threshold trip circuit 47, is connected in parallel with transistor pair 71 and transistors 88 and 83 which comprise the other trip circuits.

When Triac 56 switches to its conducting condition, the initially high inrush current through the relay solenoid causes an increased voltage drop across resistor 130. This voltage drop biases the emitter of transistor 131 positive with respect to its base so that current flows through resistor 132 to begin charging capacitor 134. Consequently, the base of transistor 131 beings to rise toward a positive level with respect to its emitter. If the relay solenoid pulls the relay armature in, as it normally will, the magnitude of the voltage across resistor 130 decreases sharply in a short time and current is no longer supplied to charge capacitor 134. Capacitor 134 then discharges through resistor 133 and the base of transistor 135 never becomes sufficiently positive to begin conducting current. If, however, the relay armature fails to pull in properly, the solenoid will remain in the low impedance condition due to the open magnetic circuit in its armature, and a high average current will continue to flow through resistor 130. Consequently, the voltage across resistor 133 will remain high and capacitor 134 will charge to a positive voltage sufficient to cause transistor 135 to begin conducting. When transistor 135 turns on, pair 57 will turn off as previously described which causes Triac 56 to cease conducting current to the relay solenoid. Likewise, the side of capacitor 66 connected to the junction of resistors 67 and 69 will rise to a more positive value and the trip threshold of pair 71 will decrease which will cause pair 71 to conduct. Thereafter a period of time must elapse before capacitor 66 can be charged through resistor 76 to reset pair 71 and the remainder of the circuit. During this period of time, solenoid 23 will cool down so that it will not be injuriously affected by a subsequent attempt to energize the relay and start the compressor motor.

While a relatively long time delay of about five minutes must expire in the event that a motor over-current condition has tripped pair 71, only a shorter period of time need expire in the event that the circuit is tripped by either transistors 83,88 or 135. This is because a trip due to a motor over-current condition will discharge the voltage across capacitor 66 to an extent providing a high positive voltage at input 70 which is above the trip level and the capacitor must charge from resistor 76 through this large voltage increment before the base of pair 71 is driven sufficiently negative to reach the reset level. However, in the event the circuit was tripped due to relay over-current condition, capacitor 66 will most likely have a larger voltage across it at the time of trip and need charge only through a lesser voltage difference before pair 71 reaches the reset level. Capacitor 66 determines both the on time for a motor current related trip and off periods for the entire circuit in the event of a trip.

Typical component values are given in the following table:

| Semiconductors | | Resistors | | Capacitors | |
|---|---|---|---|---|---|
| Ref. No. | Part No. | Ref. No. | Value | Ref. No. | Value |
| 108 | IN4148 | 101 | 3.3k | 97 | 0.01UF |
| 118 | IN4148 | 103 | 665 OHM±1% | 111 | 0.01UF |
| 119 | IN4148 | 65 | 6.2K | 115 | 0.01UF |
| 120 | IN4148 | 76 | 1.8M | 117 | 0.05UF |
| 121 | IN4148 | 92 | 120K | 66 | 220UF |
| 79 | IN4148 | 93 | 43K | 113 | 1.0UF |
| 110 | IN4148 | 94 | 1.2K | 134 | 0.5UF |
| 109 | IN4148 | 104 | 820K | | |
| 112 | IN4148 | 102 | 330K | | |
| 114 | IN4148 | 96 | 15K | | |
| 116 | IN270 | 89 | 4.7M | | |
| 68 | IN4148 | 72 | 33K | | |
| 71 | 2N5306 | 73 | 72 | | |
| 88 | 2N5172 | 74 | 118 | | |
| 83 | SPS2366 | 105 | 442 | | |
| 57 | SPS6613 | 69 | 76.8 OHM | | |
| 95 | 2N5088 | 67 | 110 | | |
| Triac 56 | RCA-6110 | 4106 | 68K | | |
| | | 107 | 100 | | |
| 135 | 2N5172 | | | | |
| | | 122 | 100 | | |
| 131 | 2N4250 | | | | |
| | | 130 | 0.5 OHMS | | |
| | | 132 | 47K | | |
| | | 133 | 510K | | |

The operation of the motor protection system will be apparent from the foregoing description. By providing an integrated signal to the trip circuit, a period of time is allowed to elapse before a trip occurs due to a high relay solenoid current. The length of time required before a trip will depend on the severity of the overload and, therefore, effectively protects the solenoid against excessive heating. Under normal conditions the current will drop within a period of about 50 milliseconds to a value such that the integrator output never reaches the trip level. On the other hand, if the high relay solenoid current persists, the integrator will rise to the trip level and de-energize the solenoid. Thereafter a period of time will be required for the reset signal to be integrated to the reset level of the system so that the relay solenoid cools sufficiently that a subsequent attempt at starting the compressor motor will not damage the solenoid even in the event that the armature again fails to pull in properly.

Accordingly, the system of this invention provides protection against a malfunctioning relay so that the malfunction can be corrected before the relay is burned out. This increases the reliability of the refrigeration system by providing protection against relay failure and reduces repair costs by eliminating the source of trouble and damage.

While a preferred embodiment of this invention has been described for purposes of illustration, it will be appreciated that the invention may be otherwise embodied within the scope of the following claims.

I claim:

1. A control system for the compressor motor of a refrigeration system comprising:
   A. a relay having a relay solenoid controlling electrical contacts for connecting and disconnecting said compressor motor with a source of electric current;
   B. solid state switch means controlling the energizing and de-energizing of said relay solenoid;
   C. relay current sensing means connected to provide a relay solenoid current signal responsive to the magnitude of current drawn by the relay solenoid;
   D. a first trip circuit having a trip level for rendering said switch means nonconducting in response to an input signal of a predetermined magnitude being supplied thereto;
   E. integration circuit means for integrating the relay current signal from the relay current sensing means, and for supplying the integrated output signal to said first trip circuit, the integration function being selected so that in the event the initial relay current is reduced to a normal level after a period of time, the output signal level from the integration circuit will be below said trip level, but in the event that an abnormally high relay solenoid current continues for an excessive period of time, the integrated output signal will reach the trip level of said first trip circuit and de-energize said relay by actuating said switch means to the nonconducting state to protect the relay solenoid;
   F. compressor motor current sensing means and a second trip circuit responsive to the magnitude of the sensed compressor motor current connected for actuating said switch means to the nonconducting state upon the occurrence of an excess motor current condition;
   G. reset time delay means for resetting said second trip circuit after a period of time subsequent to a trip thereof; and
   H. feedback means for tripping said second trip circuit upon actuating of said switch means to the nonconducting state so that the reset time delay associated with the second trip circuit is imposed on the system when it is tripped by the first trip circuit.

2. A control system for the compressor motor of a refrigeration system comprising:
   A. a relay having a relay solenoid controlling electrical contacts for connecting and disconnecting said compressor motor with a source of electric current;
   B. solid state switch means controlling the energizing and de-energizing of said relay solenoid;
   C. relay current sensing means connected to provide a relay solenoid current signal responsive to the magnitude of current drawn by the relay solenoid;
   D. a relay overload trip circuit associated with said relay current sensing means and having a trip level for rendering said switch means nonconducting in response to a relay solenoid current overload condition;
   E. integration circuit means for integrating the relay current signal from the relay current sensing means, and for supplying the integrated output signal to said relay overload trip circuit, the integration function being selected so that in the event the initial relay current is reduced to a normal level after a period of time, the output signal level from the integration circuit will be below said trip level, but in the event that an abnormally high relay solenoid current continues for an excessive period of time, the integrated output signal will reach the trip level of said to-relay overload-trip circuit and de-energize said relay by actuating said switch means to the nonconducting state to protect the relay solenoid;

F. compressor motor overload sensing means connected for providing a motor overload current signal responsive to a motor overload condition;

G. a motor overload trip circuit associated with said relay current sensing means for rendering said switch means nonconducting in response to a motor overload condition; and H. reset time delay means for maintaining said switch means nonconducting for a period of time subsequent to the switch being rendered nonconducting due to an overload condition sufficient to actuate either of said trip circuits, whereby said reset time delay is imposed on re-energizing both said compressor motor and said relay solenoid if either experiences a sensed overload condition of a magnitude sufficient to trip the control system.

* * * * *

UNITED STATES PATENT OFFICE
CERTIFICATE OF CORRECTION

Patent No. 3,742,302  Dated June 26, 1973

Inventor(s) DONALD E. NEILL

It is certified that error appears in the above-identified patent and that said Letters Patent are hereby corrected as shown below:

Column 7, in the table, under column heading Capacitor, subheading Value, the third decimal value "0.01UF" should read --.1UF--

Column 9, line 2, "to-relay" should read --relay--

Signed and sealed this 20th day of August 1974.

(SEAL)
Attest:

McCOY M. GIBSON, JR.
Attesting Officer

C. MARSHALL DANN
Commissioner of Patents